(12) United States Patent
Trübenbach et al.

(10) Patent No.: US 12,553,511 B2
(45) Date of Patent: Feb. 17, 2026

(54) TRACTION DRIVE HAVING A COOLING SYSTEM WITH TWO COOLING CIRCUITS

(71) Applicant: ZF Friedrichshafen AG, Friedrichshafen (DE)

(72) Inventors: Michael Trübenbach, Friedrichshafen (DE); Horst Leichsenring, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 58 days.

(21) Appl. No.: 18/569,815

(22) PCT Filed: Jun. 13, 2022

(86) PCT No.: PCT/EP2022/065947
§ 371 (c)(1),
(2) Date: Dec. 13, 2023

(87) PCT Pub. No.: WO2022/263339
PCT Pub. Date: Dec. 22, 2022

(65) Prior Publication Data
US 2024/0288060 A1    Aug. 29, 2024

(30) Foreign Application Priority Data
Jun. 16, 2021   (DE) .................... 10 2021 206 117.6

(51) Int. Cl.
*F16H 57/04*     (2010.01)
*B60K 11/02*     (2006.01)
(Continued)

(52) U.S. Cl.
CPC .......... *F16H 57/0413* (2013.01); *B60K 11/02* (2013.01); *F01P 3/20* (2013.01);
(Continued)

(58) Field of Classification Search
CPC ............. F16H 57/0413; F16H 57/0475; F16H 57/0476; F16H 57/0412; B60K 11/02; F01P 3/20; F01P 2003/001; H02K 11/33
(Continued)

(56) References Cited

U.S. PATENT DOCUMENTS

| 10,094,464 B2 | 10/2018 | Dickson et al. |
| 10,415,452 B1 | 9/2019 | Shepard et al. |

(Continued)

FOREIGN PATENT DOCUMENTS

| DE | 42 22 088 A1 | 1/1994 |
| DE | 10 2012 201 819 A1 | 8/2013 |
| DE | 10 2013 201 787 A1 | 8/2014 |

OTHER PUBLICATIONS

German Patent Office, Search Report issued in German patent application No. 10 2021 206 117.6 (Jan. 24, 2022).
(Continued)

*Primary Examiner* — Steve S Tanenbaum
(74) *Attorney, Agent, or Firm* — Finch & Maloney PLLC

(57) ABSTRACT

A traction drive for propelling a vehicle includes first and second drive components (1, 1\*) that generate heat during operation. A cooling system for tempering the drive components (**1, 1\*, 2, 2\*) has a first cooling circuit (3), a second cooling circuit (4), and a heat exchanger (5). The heat exchanger (5) is designed to transfer heat between the first and second cooling circuits (3, 4). The first cooling circuit (3) passes through the first drive component (1, 1\*) in order to temper the first drive component (1, 1\*) and the second cooling circuit (4) passes through the second drive component (2, 2\*) in order to temper the second drive component (2, 2\*). A valve (36) is arranged in the first cooling circuit (3) for adjusting the flow of coolant from the first cooling circuit (3) through the heat exchanger (5**).

15 Claims, 2 Drawing Sheets

(51) Int. Cl.
*F01P 3/00* (2006.01)
*F01P 3/20* (2006.01)
*F01P 7/14* (2006.01)
*F01P 7/16* (2006.01)
*H02K 7/116* (2006.01)
*H02K 9/19* (2006.01)
*H02K 11/33* (2016.01)

(52) U.S. Cl.
CPC ............ *F01P 7/16* (2013.01); *F16H 57/0415* (2013.01); *F16H 57/0435* (2013.01); *F16H 57/0475* (2013.01); *F16H 57/0476* (2013.01); *H02K 7/116* (2013.01); *H02K 9/19* (2013.01); *H02K 11/33* (2016.01); *F01P 2003/001* (2013.01); *F01P 2003/006* (2013.01); *F01P 2007/146* (2013.01)

(58) Field of Classification Search
USPC .......................................................... 165/296
See application file for complete search history.

(56) References Cited

U.S. PATENT DOCUMENTS

| | | |
|---|---|---|
| 10,443,483 B2 | 10/2019 | Scavone et al. |
| 11,370,293 B2 | 6/2022 | Merz et al. |
| 2013/0140001 A1* | 6/2013 | Mandl ................ B60H 1/143 |
| | | 165/96 |
| 2016/0084146 A1 | 3/2016 | Almkvist et al. |
| 2017/0211715 A1 | 7/2017 | Balmaceda et al. |
| 2019/0383202 A1* | 12/2019 | Kaneko .................. F01P 7/165 |
| 2020/0079177 A1* | 3/2020 | Ferraris ............ B60H 1/00278 |
| 2020/0238818 A1* | 7/2020 | Takazawa ............... F01P 7/165 |

OTHER PUBLICATIONS

European Patent Office, International Search Report issued in International patent application No. PCT/EP2022/065947 (Sept. 7, 2022).

European Patent Office, Written Opinion issued in International patent application No. PCT/EP2022/065947 (Sept. 7, 2022).

* cited by examiner

TRACTION DRIVE HAVING A COOLING SYSTEM WITH TWO COOLING CIRCUITS

RELATED APPLICATIONS

This application claims the benefit under 35 U.S.C. § 371 as a U.S. National Phase Application of application no. PCT/EP2022/065947, filed on 13 Jun. 2022, which claims the benefit of German Patent Application no. 10 2021 206 117.6 filed 16 Jun. 2021, the contents of which are hereby incorporated herein by reference in their entireties.

FIELD OF THE DISCLOSURE

The invention relates to a traction drive for propelling a vehicle, in particular a motor vehicle. The traction drive comprises a plurality of drive components which give off heat during operation, and a cooling system for cooling the drive components. The invention also relates to a method for producing a specified temperature in one or more of the drive components of the traction drive.

BACKGROUND

In current traction drives for vehicles, in most cases a water-cooling system is provided in order to cool a traction motor, for example an internal combustion engine or an electric traction battery. The cooling system is then often used to cool a transmission or electronic components of the drive system as well. This has the advantage that only one pump system for the cooling water is needed and an existing temperature regulation system for the cooling water can also be used. The through-flow quantity of cooling water in the cooling circuit is usually orientated toward the cooling requirements of the drive motor or the battery. In most cases the transmission is cooled primarily by the lubrication system in the transmission. As a rule, the lubricant of the transmission is circulated by a lubricant pump which is mechanically driven by the traction motor. The through-flow quantity of lubricant in the transmission and the through-flow quantity of water in the water-cooling system are usually independent of one another. To prevent overheating of the lubricant, it is known to couple the lubricant circuit and the water-cooling thermally with one another by way of a heat exchanger.

This has some disadvantages. Owing to the high efficiencies that can nowadays be achieved is drive components, the quantity of heat produced at small and medium loads is quite small. The result can be that the drive components no longer reach their optimum operating temperature, for example 60-80° C., over long distances and instead are operated in an unfavorable temperature range. With known cooling systems it can also happen that once the system as a whole has heated up, no desirable cooling of individual components of the drive system takes place because the cooling water keeps those components unintentionally hot. Moreover, the heat transfer capacity of the heat exchanger is oversized for most driving situations since it is designed to cope with peak loads. Thus, a relatively high heat transfer takes place even when this is not wanted.

From EP 2 599 651 A1 a vehicle with a first and a second heating/cooling circuit is known. The first heating/cooling circuit has arranged in it a heat source/sink and a first pump, and the second heating/cooling circuit has in it a battery to be heated/cooled and a second pump. The two heating/cooling circuits can be connected with one another by at least one valve in such manner that the same liquid heat carrier flows through both heating/cooling circuits. In the second heating/cooling circuit a heat exchanger can be provided between the valve and the battery.

SUMMARY

The purpose of the present invention is to improve upon the prior art.

This objective is achieved by a traction drive with a cooling system as disclosed herein.

A traction drive is proposed for propelling a vehicle, in particular a motor vehicle such as a passenger car or a truck or a powered omnibus. The traction drive comprises a first drive component that generates heat during operation, and a second drive component that generates heat during operation. In other words, these components produce waste heat during operation.

A cooling system of the traction drive serves for the tempering of the two said components. The cooling system has a first cooling circuit, a second cooling circuit and a heat exchanger. The heat exchanger couples the two circuits thermally to one another and is therefore designed to exchange heat between the two cooling circuits. The first cooling circuit passes through the first drive component for tempering the first drive component. And the second cooling circuit passes through the second drive component for tempering the second drive component. Thus, the two cooling circuits are designed in order, during the operation of the traction drive—as required—on the one hand to extract heat from the drive components (i.e., to cool them) and on the other hand to transfer heat into the drive components (i.e., to warm them).

A first valve is provided in the first cooling circuit. This first valve is designed to control the coolant passing through the heat exchanger from the first cooling circuit. In particular, for that purpose the valve is arranged in the first cooling circuit upstream from the heat exchanger. Thus, by virtue of this first valve the through-flow quantity of coolant from the first cooling circuit flowing through the heat exchanger can be adjusted. In that way the amount of heat exchanged between the two cooling circuits can be adjusted. Accordingly, the two cooling circuits and the drive components tempered by them can be thermally coupled to one another and also thermally decoupled from one another.

Consequently, it is possible to operate the drive components selectively at an almost identical temperature or at different temperatures. Each of the two drive components can be selectively cooled or warmed. By virtue of the two cooling systems one of the drive components can heat the other drive component selectively and also cool it selectively. This is done in a very simple way by means of the first valve. There is no need for an elaborate control system for the pump rotation speed of a coolant pump. Simple mechanical pumps can be used. Thus, to convey the coolant within the respective cooling circuit the pump of the first cooling circuit and/or the pump of the second cooling circuit can be driven mechanically by the traction motor of the traction drive, the pump rotation speed then corresponding to the rotation speed of the motor.

Thus, it can be provided that coolant flows through the heat exchanger, for example, only above a coolant temperature of 90° C. in order to cool the drive component concerned or in order to warm the drive component concerned to above 50° C. In that way the drive components can be operated in an optimal temperature range. The high thermal capacities of the coolants in the two cooling circuits can then be utilized when brief power and loss peaks occur. The coolants then take up the corresponding amounts of heat by a temporary temperature rise, for example by briefly being heated from 60° C. to 90° C. Later, the temperature falls again.

In particular, it is provided that the first valve only opens to allow the flow through the heat exchanger if a temperature reduction in the first cooling circuit is required (i.e., for cooling the first drive component) or if the second cooling circuit should be heated (i.e., for heating the second drive component). When both drive components are being cooled, or when the second drive component has reached its optimum operating temperature, or when the second drive component has not yet reached its optimum operating temperature and it can also not be heated by the coolant in the first cooling circuit (because the temperature required for that is not available in the first cooling circuit), the flow through the heat exchanger is reduced by the first valve to a minimum, or stopped completely.

The traction drive serves to propel a vehicle. In other words, during the operation of the vehicle the traction drive supplies the mechanical drive power required for propelling the vehicle. For that purpose, the traction drive comprises in particular the traction motor. This is in particular in the form of an electric machine or an internal combustion engine. The use of a combination of an internal combustion engine and an electric machine (hybrid drive) is also possible. In particular, the first or the second drive component is the traction motor. Correspondingly, the traction motor is then tempered by the first or by the second cooling circuit.

Preferably, the first cooling circuit is designed to operate with cooling water as its coolant, i.e., it is a water-cooling circuit. The cooling water can also contain additives, for example in order to prevent freezing and/or degeneration. The second cooling circuit can then be designed to operate with lubricant as its cooling and lubricating medium, i.e., as a lubricant circuit. The lubricant is in particular transmission oil. The second cooling circuit then serves not only to temper the second drive component, but also to lubricate it. In the first cooling circuit a water pump mechanically driven by the traction motor can be provided in order to propel the cooling water through the first cooling circuit. And in the second cooling circuit a lubricant pump mechanically driven by the traction motor can be provided in order to propel the lubricant in the second cooling circuit. As the heat exchanger, a water-oil heat exchanger can be provided. By using the aforesaid first valve in the cooling-water circuit of such a cooling system, the above-mentioned advantages are achieved.

In particular, it is provided that during operation the first drive component usually gives off more heat than the second drive component. By virtue of the higher thermal capacity of the cooling water in the first cooling circuit compared with the lubricant in the second cooling circuit, the first cooling circuit can be used to better effect for tempering the first drive component. In that way the second drive component too can be more effectively tempered as necessary.

Preferably, the first valve is a 4/2-way valve or a 6/2-way valve.

Preferably, the first valve is designed such that in its first valve position it is open in the direction toward the heat exchanger and in its second valve position, starting from the coolant pump it is blocked in the direction toward the heat exchanger. Thus, in the first valve position coolant of the first cooling circuit flows through the valve toward the heat exchanger and from the heat exchanger again through the valve back into the rest of the first cooling circuit. Accordingly, the valve is fluidically connected both upstream and downstream from the heat exchanger. In its second valve position the valve blocks the flow of the coolant from the first cooling circuit to the heat exchanger. No coolant then flows from the first cooling circuit into the heat exchanger and out of the heat exchanger back into the first cooling circuit. In other words, the first valve is designed in its first valve position to open up the heat exchanger to a flow of coolant from the first cooling circuit, and in its second valve position to block that coolant flow into the heat exchanger.

The first drive component can be connected fluidically parallel to the first valve. Preferably, in this case the first cooling circuit has a first cooling circuit section by which the first drive component is tempered, and a second cooling circuit section in which the heat exchanger is arranged. Thus, the first cooling circuit section leads only through the first drive component, and the second cooling circuit section leads at least or only through the heat exchanger. The first valve is thus within the second cooling circuit section. In particular, the first cooling circuit branches downstream from a coolant pump of the first circuit into the cooling circuit sections, and these come together again downstream after the first drive component and the heat exchanger. In this case a device can be provided in order to adjust the division of the through-flow quantity through the two cooling circuit sections, for example a further valve or an adjustable throttle.

Preferably, with the parallel arrangement of the first drive component and the first valve a throttle is provided in the second cooling circuit section. Thus, the throttle is also arranged fluidically parallel to the first drive component. In that case the first valve is designed such that in its second valve position it directs the coolant from the first cooling circuit through the throttle instead of the heat exchanger. This ensures that in the second valve position, owing to the blocked heat exchanger the pressure in the first cooling circuit section does not rise too much. In the first valve position of the first valve, i.e., when the valve is open in the direction toward the heat exchanger, the valve closes the path through the throttle. In other words, the first valve is then designed such that in its first valve position it opens a flow path for a coolant flow through the heat exchanger, whereas in its second valve position it opens an alternative flow path for a coolant flow through the throttle while the respectively other flow path is blocked. Accordingly, the coolant flow passes either through the heat exchanger or through the throttle. The throttle is in particular a fixed throttle (in particular a fixed restrictor or constant throttle), whose aperture can therefore not be varied during operation.

Preferably, with the usual operating conditions the flow path through the throttle and the alternative flow path through the heat exchanger have substantially the same flow resistance for the coolant. In particular the difference between the coolant flow resistances of the flow paths is less than 10%. This enables simpler adjustment and control of the coolant flow in the first cooling circuit since the valve position of the first valve in any case has a slight effect on the flow in the rest of the cooling circuit.

The first drive component can also be fluidically connected in series with the first valve. In that case the first drive component is in particular arranged upstream from the first valve. Thus, starting from the coolant pump the coolant first passes through the first drive component and then through the first valve. So, when the first valve, in its first valve position, is open toward the heat exchanger, the coolant comes out of the valve and into the heat exchanger. Preferably, from the heat exchanger the coolant flows back again to the first valve, whence it passes back into the first circuit, specifically into an air-cooler of the first cooling circuit.

Preferably, a second valve is arranged in the second cooling circuit, in particular upstream from the heat exchanger. This second valve is designed to adjust the flow of the coolant passing from the second cooling circuit through the heat exchanger. In that way the tempering of the first and/or second drive component can be done even more flexibly. In particular, this prevents coolant from the second cooling circuit from always passing into the heat exchanger and resulting in unwanted heat transfer (heating or cooling).

The second valve is preferably a 4/2-way valve. The explanations in the earlier paragraph about the first valve in the form of a 4/2-way valve, also apply analogously to the second valve and the second cooling circuit when the second valve is in the form of a 4/2-way valve.

Preferably, the first drive component or the second drive component is an internal combustion engine, an inverter, an electric machine, or a transmission. The drive component, in the form of an electric machine or an internal combustion engine, forms in particular the traction motor of the traction drive. The inverter transforms direct current, in particular from the traction battery, into alternating current, in particular for operating the electric machine as a motor. If necessary, this transformation by the inverter can also take place in the converse direction. i.e., from alternating current to direct current, for example in order to recharge the traction battery (operation of the electric machine as a generator). Thus, the inverter serves in particular for supplying the electric machine with alternating current. Accordingly, the electric machine is in the form of a rotating-field machine such as a synchronous machine, an asynchronous machine, or a reluctance machine.

In particular, the first drive component is the inverter or the internal combustion engine. During operation these generate a relatively large amount of waste heat, particularly at peak power, and therefore have to be cooled intensively. That is the purpose of the first cooling circuit, particularly when it is in the form of a water-cooling circuit. In particular the second drive component is the electric machine or the transmission or a combination of the electric machine and the transmission. During operation these also need lubrication, and for that reason a second cooling circuit in the form of a lubricant circuit is particularly suitable for lubricating and tempering.

The traction drive can additionally comprise the electric traction battery. In that case the first cooling circuit can also lead through the traction battery in order to temper it. The first drive component and the traction battery can be connected fluidically in the first cooling circuit in series or in parallel with one another.

Preferably, the traction drive is an electric traction rive in order to propel a vehicle by means of electrical energy. In that case, the first drive component is the inverter and the second drive component is the electric machine or the transmission or a combination of the electric machine and the transmission. The transmission serves in that case to transmit a drive torque produced by the electric machine, so that the drive wheels of the vehicle can be powered by the electric machine.

Preferably, there is an air cooler in the first cooling circuit. This is designed to cool the coolant in the first cooling circuit by means of air. The air cooler forms a further heat exchanger of the cooling system. It serves to give up heat from the coolant of the first cooling circuit to the surroundings. Thus, heat can be extracted from the first circuit in a simple manner. Thanks to the thermal coupling of the two cooling circuits by means of the heat exchanger if that is necessary, by means of the air cooler heat can also be extracted indirectly from the second cooling circuit as well.

Preferably, a thermostat is arranged upstream from the air cooler of the first cooling circuit. The thermostat is designed, if the coolant temperature in the first cooling circuit is lower than a predetermined temperature threshold, to block the path of the coolant through the air cooler partially or completely and to open up, partially or fully, a bypass around the air cooler for the coolant. In addition, the thermostat is designed, if the coolant temperature in the first cooling circuit exceeds the predetermined temperature threshold, to re-open again the coolant path through the air cooler for the coolant and to partially or completely close the coolant bypass. The thermostat works autonomously (automatically) by means of a heat-actuated actor, for example, based on a bimetal, a wax motor, or a shape-memory alloy. Below the predetermined temperature threshold, the coolant bypasses the air cooler via the bypass. In that way the first cooling circuit heats up more rapidly. Above the predetermined temperature threshold, the bypass is deactivated by the thermostat so that heat is extracted from the first cooling circuit by the air cooler.

Preferably, the traction drive comprises a control unit. This can be designed to actuate at least the first valve. In the control unit a temperature model of the traction drive can then be stored in the control unit, so that the control unit actuates the valve with reference to the temperature model, i.e., opens or closes the valve. In that way the valve and therefore the heat transfer between the two cooling circuits can be adjusted particularly appropriately for what is needed. In particular, information about the current state of the traction drive is sent to the temperature model, from which it determines the corresponding temperature values of the drive components. By selectively opening and closing at least the first valve and optionally also the second valve, the drive components can thereupon be appropriately tempered so that they are always operated in the optimum temperature range. In particular, after having been determined, the electrical energy (for example current, voltage, power) communicated to the traction drive constitutes an input parameter for the temperature model, on the basis of which the temperature of one or more structural elements of the traction drive, such as that of the inverter and/or the electric machine, is determined.

When using the temperature model, some or all of the (usually present) temperature sensors in the cooling circuits can be dispensed with. In particular therefore, the first and/or the second cooling circuit is free from temperature sensors that emit a corresponding measured value (for example for the regulation or control of the coolant temperature concerned). Regardless of that, one or more temperature sensors in the area of the electric traction battery can be provided, which serve for the control of the traction battery.

The control unit can perform several functions for the traction drive. In particular the control unit also serves to actuate the aforesaid second valve in the second cooling circuit. Thus, the first valve and the second valve can be actuated advantageously with reference to the temperature model stored in the control unit. In that way the two drive components can be tempered particularly effectively. The control unit can also serve to actuate the first and/or the second drive component, in particular for controlling the drive component concerned. Respective valves are actuated with the help of a suitable valve actor such as an electromagnet or a servo-motor activated by the control unit.

Alternatively, or in addition, the control unit can be designed to actuate at least the first valve with reference to a measured temperature of the coolant in the first cooling circuit and/or the second cooling circuit and/or the first drive component and/or the second drive component, i.e., to open or close the valve. Here too, the control unit can optionally be designed to actuate the second valve as well with reference to the measured temperature. In that way the temperature model can be bypassed, for example if compared with the calculation by the temperature model the actual temperature is too high or too low. Or else, in that way the implementation of the temperature model can be entirely dispensed with. Then, recourse can be had to a less powerful control unit. For temperature measurement a temperature sensor is provided in particular in each cooling circuit or on each drive component, which sensor communicates the temperature it measures or a corresponding measured value to the control unit.

Preferably, the control unit is designed to keep the first drive component and the second drive component within a specified temperature range by actuating at least the first valve and in particular also the second valve. Then, the drive components can be heated by drawing heat from the respective other cooling circuit, and cooling can take place by giving up heat to the respective other cooling circuit. The temperature range is a range in which the drive components work in an optimum way. i.e., an optimum operating temperature. A common temperature range can be specified for both drive components. Or else, a temperature range can be specified individually for each of the two drive components. The control unit then actuates the valve or valves in such manner that during the operation of the traction drive, the (respective) temperature range is kept to as closely as possible.

However, it is also possible for the first valve and/or the second valve to be actuated automatically with reference to the coolant temperature with which it is in contact. In that case the actuation takes place not by way of the control unit, but autonomously by the valve itself, in particular by a heat-activated actor in the valve. This can substantially simplify the structure of the cooling system.

The method also proposed serves to produce a predetermined temperature (target temperature) at one or more of the drive components of the proposed traction drive. For this, at least the first valve and optionally also the second valve is/are actuated in order to adjust the coolant passing through the heat exchanger from the first cooling circuit (and with the second valve also from the second cooling circuit). In that way the specified temperature is also produced at the drive component(s). In other words, the current actual temperature of the drive component(s) is made equal to the target temperature by actuating the valve or valves. The method is carried out in particular in the control unit of the traction drive. For example, the specified temperature can be stored in the control unit or determined by it.

Preferably, in the method a temperature change of the actual temperature of the respective drive component is determined and taken into account for the actuation of the valve or valves. The temperature change then influences the actuation of the respective (first and/or second) valve. In that way the temperature variation with time of the drive component can be anticipated. The valve or valves can thus be actuated proactively in order to produce the specified temperature of the drive component concerned more quickly and selectively. Overshooting in setting the temperature, for example due to temporarily too much or too little cooling, can be avoided in that way. As the temperature change, in particular a temperature change per unit of time ($\Delta T/t$) is taken into account. Alternatively, or in addition, the acceleration of the temperature change can also be taken into account. To determine the temperature change, in particular the temperature model of the traction drive is used. In that way the temperature of the drive component concerned can be determined in real time, even before the coolant temperature of the first and/or second cooling circuit shows a variation.

BRIEF DESCRIPTION OF THE DRAWINGS

Below, the invention is explained in greater detail with reference to figures from which further preferred embodiments of the invention emerge. The figures show, in each case represented schematically.

In the figures, functionally equivalent structural elements are denoted by the same indexes.

DETAILED DESCRIPTION

Figure 1:
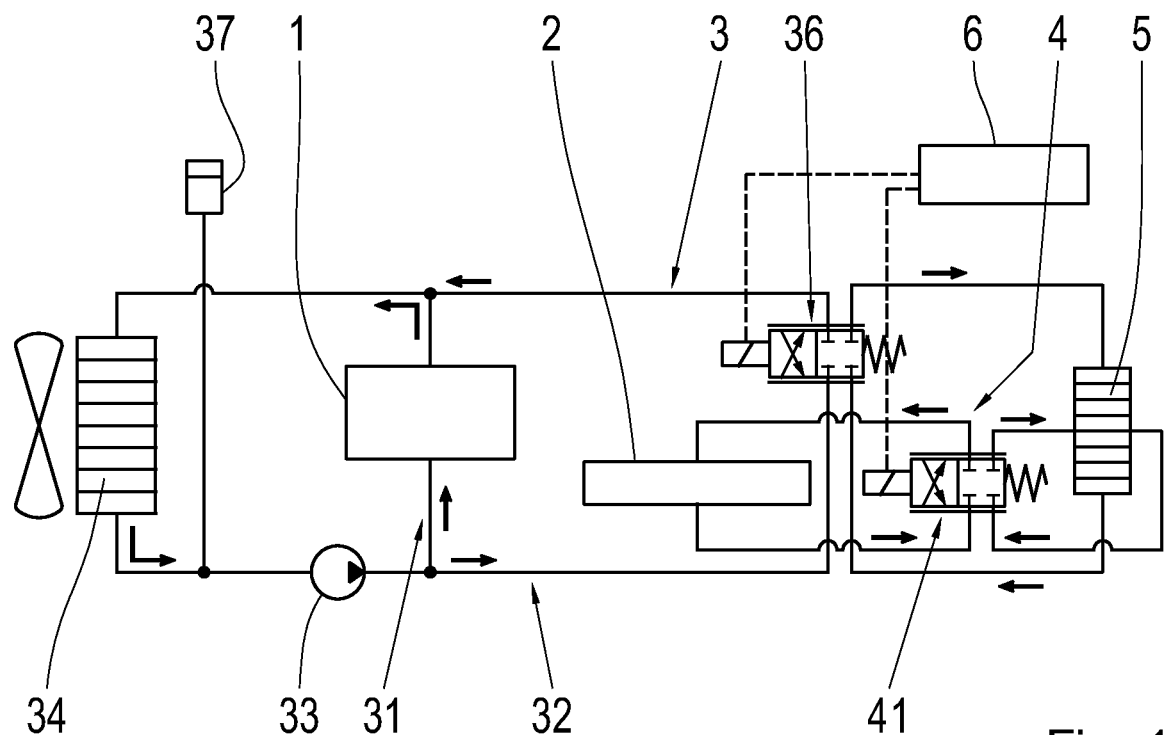
FIG. 1: A first variant of a traction drive with a cooling system.

FIG. 1 shows a purely electric traction drive for propelling a vehicle by means of electrical energy. The traction drive comprises an electric machine 2 that serves as the traction motor and which can be coupled to a transmission, or in which a transmission can be integrated. Furthermore, the traction drive comprises an inverter 1 which serves to energize the electric machine 2 with three-phase current. The electrical energy is drawn from a traction battery (not shown). For recuperation the electric machine 2 can be operated as a generator, whereby electrical energy is fed back into the traction battery from the inverter 1. The inverter 1 constitutes a first drive component of the traction drive, which gives off heat during its operation. And the electric machine 2 constitutes a second drive component of the traction drive, which also gives off heat during its operation. To prevent overheating of the components 1 and 2 and to operate them optimally, that heat has to be dissipated. The optimum temperature range for operating the components 1 and 2 is, for example, 60-80° C. It is therefore desirable to reach that temperature range as quickly as possible and then to maintain it.

To temper the components 1, 2 the traction drive has a cooling system. The cooling system comprises a first cooling circuit 3 for the inverter 1 and a second cooling circuit 4 for the electric machine 2. The first cooling circuit 3 is in the form of a water-cooling circuit. Thus, the coolant circulating in it is cooling water. The second cooling circuit 4 is in the form of a lubricant circuit. Thus, the coolant circulating in it is a lubricant such as an oil, which at the same time serves to lubricate the electric machine 2 and optionally the transmission as well. The preferred flow direction in the two circuits 3 and 4 is indicated in FIG. 1 by arrows. At suitable points one-way valves can be provided, to prevent the coolant from flowing in the wrong direction in the cooling system.

The cooling circuit 3 comprises a pump 33 for propelling the coolant within the cooling circuit 3. The pump 33 can be made as a separate component. The pump 33 is preferably driven mechanically by the electric machine 2. The rotation speed of the pump 33 (pump rotation speed) is thus always coupled to the rotation speed of the electric machine 2 (motor rotation speed). In particular, the pump 33 has a constant delivery volume per revolution, for example being a gearwheel pump such as an outer gearwheel or an inner gearwheel pump.

Downstream from the pump 33 the cooling circuit divides into two cooling circuit sections 31 and 32 connected in parallel. The first section 31 passes through the inverter 1 in order to pick up heat from it or, if necessary, give up heat to it. The second section 32, which is connected fluidically parallel to the inverter 1, passes through the heat exchanger 5 of the cooling system. The heat exchanger 5 transfers heat between the coolants of the first and second cooling circuits 3, 4. Such heat exchangers 5 are already known. The heat exchanger 5 can be in the form, for example, of a plate-type heat exchanger.

The two sections 31 and 32 come together again downstream from the inverter 1 and the heat exchanger 5, and upstream from an air cooler 34. Thus, the air cooler 34 is connected fluidically in series with the two cooling circuit sections 31, 32. The air cooler serves to transfer heat from the coolant of the first cooling circuit 3 to the ambient air, for example by virtue of the airflow during driving, by convection, or by a fan. From the air cooler 34 the coolant passes back again to the coolant pump 33.

At a suitable point the first cooling circuit 3 has an equalizing tank 37. This is arranged fluidically, for example, between the air cooler 34 and the pump 33.

Upstream from the air cooler 34 a thermostat can be provided (see FIG. 2), which bridges across the cooler 34 if the coolant temperature there is lower than a temperature threshold. In that way the cooler 34 can be prevented from giving up heat when the inverter 1 has not yet reached its optimum temperature.

To prevent coolant of the first cooling circuit 3 from always passing through the heat exchanger 5 and there picking up or giving up heat, in the second section 32 of the cooling circuit 3 a first valve 36 is provided, by means of which the coolant through-flow quantity through the heat exchanger 5 can be adjusted. Thus, the component 1 and the valve 36 are fluidically connected in parallel. Preferably the valve 36 is a 4/2-way valve as shown in FIG. 1.

In its second valve position, which is precisely the one shown in FIG. 1, the first valve 36 blocks the flow of the coolant in the first cooling circuit through the heat exchanger 5 and opens the flow in its first valve position. In the second valve position of the valve 36 the flow path leading through the heat exchanger 5 is completely blocked. Thus, the flow of coolant through the heat exchanger 5 is stopped almost completely.

Alternatively, the valve 36 can be designed such that in its second valve position it switches the flow path of the heat exchanger 5 through the valve 36 as a separate circuit. This is shown, for example, in FIGS. 3 and 4. Then, in the second valve position of the valve 36 a separate circuit is formed in the valve 36, which contains the heat exchanger 5 and the passage through the valve 36. In the second valve position of the valve 36 this allows a certain amount of coolant to flow through the heat exchanger 5, for example by convection, although it is thermally separated from the first circuit 3.

It is optionally possible for one or both of the valves 36, 41 to be able to move to intermediate positions. In that way the respective through-flow quantities through the heat exchanger 5 and thereby the amount of heat transferred between the cooling circuits 3, 4 can be finely adjusted. Preferably, the valves 36 and 41 are each actuated electrically by an electromagnet.

The cooling circuit 4 also has a pump for propelling the coolant within the cooling circuit 3. For the sake of simplicity this pump is not shown in FIG. 1. It is in particular integrated in the electric machine 2. The pump is also preferably driven mechanically by the electric machine 2. Thus, in this case too the pump rotation speed is always coupled to the motor rotation speed. This pump as well has a constant delivery volume per revolution, and is, for example, a gearwheel pump.

The cooling circuit 4 passes through the electric machine 2 in order to extract heat from it and, if necessary, to give up heat to it. Downstream, after the electric machine 2, the cooling circuit 4 passes through the heat exchanger 5. As already explained earlier, the heat exchanger 5 serves for the transfer of heat between the two circuits 3 and 4.

In the second circuit 4 as well, a valve 41 (the second valve) is provided, in order to prevent the coolant of that circuit 4 from always passing into the heat exchanger 5 and thereby taking up or giving up heat. Analogously to the first valve 36, by means of this second valve 41, the quantity of coolant of the second circuit 4 flowing through the heat exchanger 5 can be adjusted.

One or both of the valves 36, 41 is/are actuated by the control unit 6. In other words, the control unit 6 generates corresponding commands for opening and closing the valve 36, 41 concerned. For that purpose, the control unit 6 processes information about the traction drive, in particular such as power information and/or information about the temperature of the coolant in the circuits 3 and 4 and/or the drive components 1 and 2. Preferably, a temperature model of the traction drive is stored in the control unit 6, with reference to which it actuates the valve 36, 41 concerned.

Alternatively, it is possible for one or both valves 36, 41 to work automatically. In that case the valve concerned comprises a corresponding actor which operates the valve 36, 41 automatically with reference to the temperature in contact with it.

Preferably, in one or both of the circuits 3, 4 an additional over-pressure valve (pressure-limiting valve) is provided, which limits the pressure in the respective circuit 3, 4 and/or at the pump of the circuit 3, 4 concerned to a particular pressure level. Such an over-pressure valve can in particular be advantageous when the valve 36 or 41 is at least partly closed and the flow resistance is therefore correspondingly elevated.

Figure 3:
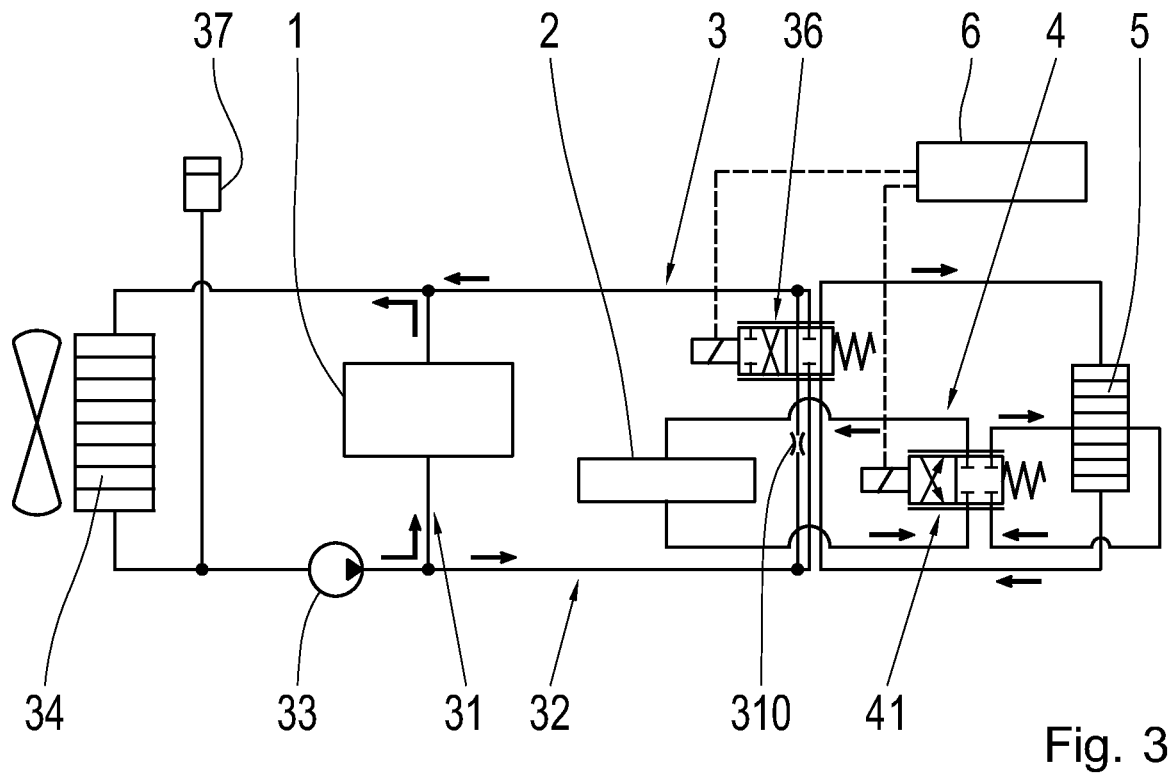
FIG. 3: A third variant of a traction drive with a cooling system.

When the valve 36 is open, in order to be able to adjust the coolant quantities flowing through the two sections 31, 32 more effectively, an additional limiting valve or a throttle can be provided in one or both of the circuits 31, 32 (see for example FIG. 3).

The traction drive shown can also comprise the electric traction battery in order to supply electrical energy at least to the inverter 1 and the electric machine 2. The battery is not shown in FIG. 1. This battery too should advantageously be tempered. For that purpose, it can be included in the first cooling circuit 3, for example being arranged parallel to or in series with the electric machine 2 in the cooling circuit 3.

Figure 2:
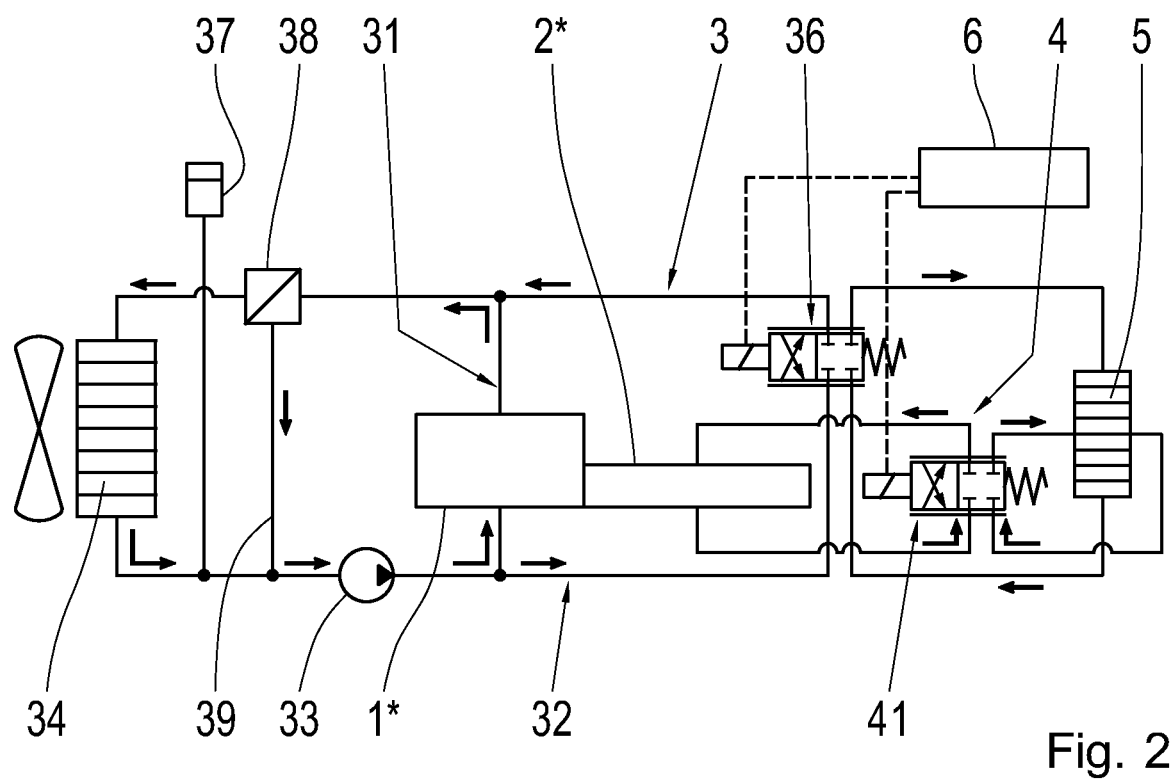
FIG. 2: A second variant of a traction drive with a cooling system.

FIG. 2 shows a traction drive for propelling a vehicle at least partially by means of an internal combustion engine 1*. Thus, the internal combustion engine 1* serves as the traction motor of the traction drive. A transmission 2* is drivingly coupled to the internal combustion engine 1*. In this case the transmission 2* is in particular a multi-gear transmission, i.e., one with a plurality of gears that can be engaged, such as an automatic transmission or an automated manual transmission. The internal combustion engine 1*   and the transmission 2* constitute drive components of the traction drive. Optionally, an electric machine can be provided as an additional traction motor (hybrid drive). This electric machine can then be integrated in the combustion engine 1* or in the transmission 2*.

The traction drive in FIG. 2 has a cooling system designed analogously to that of FIG. 1. In this case the internal combustion engine 1* is tempered by the first cooling circuit 3 and the transmission by the second cooling circuit 4. Accordingly, the above explanations regarding the cooling system in FIG. 1 also apply analogously to the cooling system in FIG. 2.

In the cooling system shown in FIG. 2, otherwise than in FIG. 1 the thermostat 38 is shown upstream from the cooler 34 in the first cooling circuit 3. As explained earlier, at a coolant temperature below the specified temperature the thermostat 38 bridges across the air cooler 34. For that, the coolant passes through a bypass 39 connected fluidically parallel to the air cooler 34 instead of through the air cooler 34 itself. The bypass opens upstream from the pump 33 into the line that extends between the cooler 34 and the pump 33.

FIG. 3 shows a variation of the traction drive in FIG. 1. The explanations regarding FIG. 1 therefore still apply to the variant in FIG. 3, apart from the differences mentioned below.

In the variant shown in FIG. 3, in the second cooling circuit section 32 of the first cooling circuit 3 a throttle 310 is provided. This is connected fluidically parallel to the first drive component 1 and to the heat exchanger 5 and in series with the valve 36. The first valve 36 is in this case, specifically in the form of a 6/2-way valve. The throttle 310 is located in an alternative flow path, which is activated when the flow path via the heat exchanger 5 for the coolant flow is closed. Thus, the valve 36 is designed such that in its second valve position shown in FIG. 3 the coolant flow from the first circuit 3 passes through the throttle 310 instead of through the heat exchanger 5. In its first valve position the valve 36 blocks the coolant flow from the first circuit 3 through the throttle 310 and conversely opens up the flow to the heat exchanger 5.

This configuration has the advantage that when the heat exchanger 5 is cut off, a certain coolant flow still passes through the second cooling circuit section 32 by way of the throttle 310 and the valve 36, without the coolant flow taking or giving up any heat from the heat exchanger 5. Thereby, too large a pressure increase is prevented in the first cooling circuit section 31 due to the cutting-off of the heat exchanger 5 by the valve 36. This also ensures that sufficient coolant always flows through the first component 1 and that the flow resistance in the first cooling circuit 3 always remains low enough.

To simplify the adjustability of the coolant flow in the first cooling circuit 3, the flow path that can be opened up by the valve 36 through the heat exchanger 5 has as nearly as possible the same flow resistance as the alternative flow path through the throttle 310 that can be opened up by the valve 36.

As shown in FIG. 3, it can be provided that in its second valve position the valve 36 does not completely block the flow path through the heat exchanger 5 (as shown in FIG. 1), but rather, switches it through to a separate circuit. The coolant present in the heat exchanger 5 and in the associated flow path can thus circulate to a restricted extent through the valve 36, for example by convection, without affecting the coolant flow in the rest of the cooling circuit 3. In that way, by way of the heat exchanger 5 itself, some uptake and release of heat can take place when the valve 36, in its second valve position, separates the heat exchanger 5 fluidically from the second cooling circuit section 32. This can be advantageous when the heat exchanger 5 should be acting to a limited extent as a heat source or heat sink for the second cooling circuit 4, but at the same time no heat should be given up to or extracted from the rest of the first cooling circuit 3.

Figure 4:
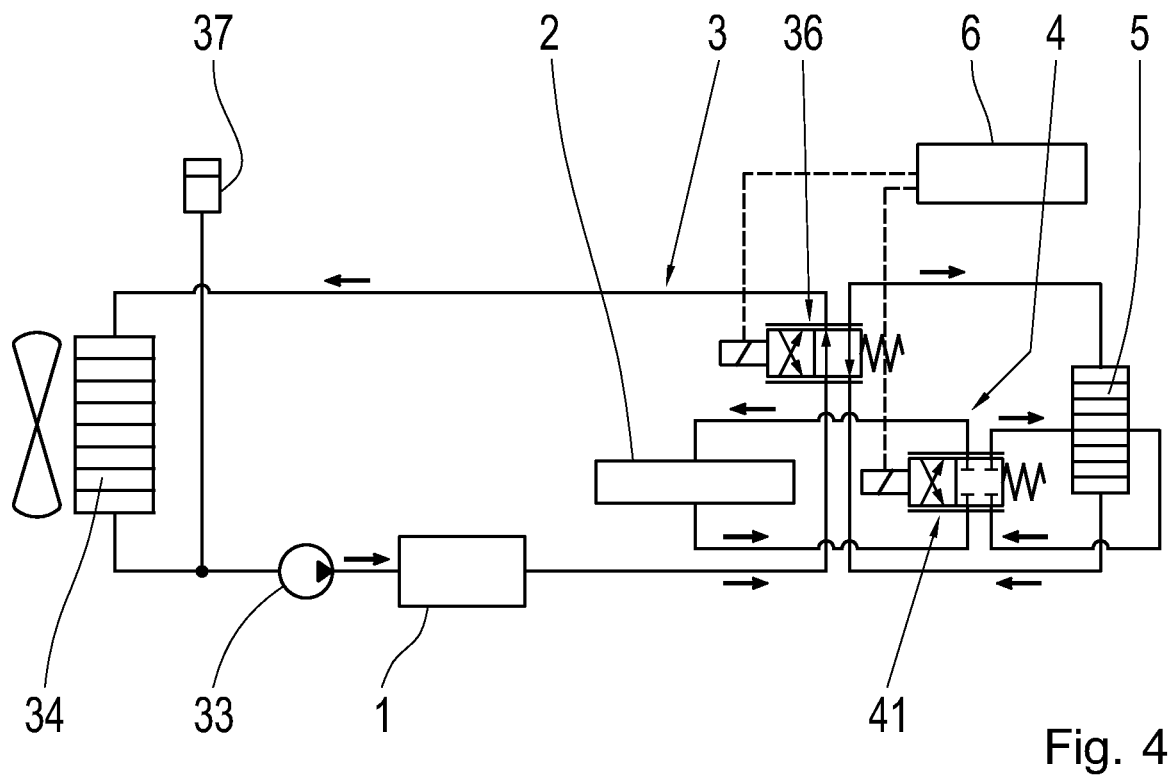
FIG. 4: A fourth variant of a traction drive with a cooling system.

FIG. 4 shows a further variant of the traction drive in FIG. 1. The explanations regarding FIG. 1 therefore also apply to the variant in FIG. 4, apart from the differences mentioned below.

According to FIG. 4, the first drive component 1 is fluidically connected in series with the first valve 36. Thus, in contrast to the variants shown in FIGS. 1 to 3, there is no need for two cooling circuit sections 31, 32 for the first circuit 3—a single section is sufficient. In this case too, the valve 36 is in particular a 4/2-way valve, which in the second valve position of the valve 36 illustrated separates the heat exchanger 5 from the coolant flow of the first cooling circuit 3. Instead, the coolant then flows through the first valve 36, bypassing the heat exchanger 5.

Analogously to FIG. 3, in its second valve position the valve 36 blocks the flow path toward the heat exchanger 5, although not completely, but rather provides a separate circuit that comprises the passage through the first valve 36 and the heat exchanger 5. In that way the above-mentioned advantages can again be obtained. Alternatively, it is possible that in its second valve position the valve 36 completely interrupts the flow path through the heat exchanger 5 analogously to the variant in FIG. 1, and thereby largely cuts off the through-flow of coolant through the heat exchanger 5.

With the cooling system shown in the figures, the coolant flow in the first cooling circuit 3 is adjusted such that coolant flows through the heat exchanger 5 when the temperature of the drive components 1, 2 should be selectively increased or reduced. In particular the coolant flow through the heat exchanger 5 is reduced to a minimum or stopped completely when the traction drive is cold or when it has already reached the desired temperature range (optimum operating temperature), or the drive components 1, 2 are just getting hotter but have not yet reached the desired temperature range. This makes it possible to reduce the losses in the pumps 33 to what is strictly necessary and to operate the drive system as a whole in the temperature range of optimum efficiency.

The use of a temperature model for the traction drive makes it possible to adapt threshold values for turning the coolant flow on and off to the local environmental conditions by software means in the control unit 6, or to store them therein, and thus to make appropriate adjustments for all climate zones. Optionally, the temperature of the traction battery can also be taken into account in the actuation of the valves 36 and 41. Thus, on the software side the temperature model can be coupled with one or more temperature sensors of the traction battery. If corresponding characteristics are present in the control unit 6, the cooling can then also be adjusted directly on the basis of these characteristics. i.e., without any need for temperature sensors in the two cooling circuits 3, 4 or without taking account of temperature measurement values from such sensors. Setting the valve position of the first and/or second valve 36, 41 then takes place by virtue of at least one characteristic, wherein the temperature model supplies one of several input variables from the characteristic or a single input variable from the characteristic.

One or both of the valves 36, 41 is preferably actuated with reference to the coolant temperature in the first cooling circuit 3 or the temperature of the first drive component 1, 1*, compared with the coolant temperature in the second cooling circuit 4 or the temperature of the second drive component 2, 2*. For that, the respective valve 36, 41 is opened when there is a sufficient temperature difference between those temperatures since there will then be a sufficient temperature gradient in the heat exchanger 5. This temperature gradient is used to reach the desired temperature of the components 1, 1*, 2, 2*. The temperature in question can be measured by appropriate sensors or calculated by the temperature model in the control unit 6. As explained earlier, alternatively, the respective valve 36, 41 can be controlled by some other suitable technical control unit, or the through-flow cross-section of the coolant flow in the valve 36, 41 can be autonomously narrowed or enlarged with the help of temperature-active materials such as a bimetal, a shape-memory material, or a wax motor. If the valve or valves 36, 41 is/are operated by the temperature model, there is no need for temperature sensors in the cooling circuits 3, 4 and/or in the drive components 1, 1*, 2, 2*.

It is also possible that the pump 33 for the first cooling circuit 3 and/or the pump for the second cooling circuit 4 are selectively operated in such manner that that the respectively specified temperature range of the drive components 1, 1*, 2, 2* is reached as quickly as possible. In this case, in particular the pump action is switched off while the specified temperature range has not yet been reached. For that purpose, for example the pump concerned can be decoupled or switched off, or its delivery quantity can be minimized. When the specified temperature range is reached, the pump action is correspondingly switched on so that the cooling of the drive components 1, 1*, 2, 2* starts again. For that, for example the pump concerned can be coupled or switched on, or its delivery quantity can be increased.

When a cooling system of a traction drive is used, which consists of a single lubricant circuit with an air-oil heat exchanger, a valve can also be arranged before or after the air-oil heat exchanger, which valve works analogously to the valve 36. In that case, the quantity flowing through the air-oil heat exchanger can also be adjusted as a function of a temperature model of the traction drive.

A method for producing a specified temperature of one or more of the drive components 1, 1*, 2, 2* of the traction drive provides that the first valve 36 and optionally also the second valve 41 is/are actuated in order to adjust the coolant passing through the heat exchanger 5 from each cooling circuit 3, 4 and in order, therefore, also to reach the specified temperature of the drive components 1, 1*, 2, 2*. The method is carried out in particular by the control unit 6. The specified temperature is in particular stored in the control unit 6 or is determined by the control unit 6 in a situation-specific manner.

Preferably, in the method a temperature change of the drive components 1, 1*, 2, 2* concerned is taken into account for the actuation of the first and/or the second valve 36, 41. Correspondingly, the temperature change plays a part in the actuation of the valve 36, 41 concerned. Thereby, the temperature variation of the drive components 1, 1*, 2, 2* can be anticipated and the production of the specified temperature can be improved.

INDEXES

1 Inverter, drive component
1* Internal combustion engine, traction drive, drive component
2 Electric machine, traction motor, drive component
2* Transmission, drive component
3 Cooling circuit
31 Cooling circuit section
32 Cooling circuit section
33 Pump
34 Air cooler
36 Valve
37 Equalizing tank
38 Thermostat
39 Bypass
310 Throttle
4 Cooling circuit
41 Valve
5 Heat exchanger
6 Control unit

The invention claimed is:

1. A traction drive for propelling a vehicle, comprising:
an inverter;
an electric machine;
a cooling system for tempering the inverter and the electric machine, wherein the cooling system comprises a first cooling circuit configured for use with a first coolant, a second cooling circuit configured for use with a second coolant, and a heat exchanger;
wherein the heat exchanger is configured to transfer heat between the first and second cooling circuits;
wherein the first cooling circuit passes through the inverter in order to temper the inverter;
wherein the second cooling circuit passes through the electric machine in order to temper the electric machine;
a valve arranged in the first cooling circuit for adjusting the first coolant passing from the first cooling circuit through the heat exchanger; and
a control unit configured to actuate the valve, wherein the control unit stores a temperature model of the traction drive and actuates the valve based on the temperature model.

2. The traction drive according to claim 1, wherein the first coolant is water and the second coolant is a lubricant.

3. The traction drive according to claim 1, wherein the inverter is connected fluidically parallel to the valve.

4. The traction drive according to claim 1, wherein the inverter is connected fluidically in series with the valve.

5. The traction drive according to claim 1, wherein the control unit is configured to maintain the inverter and the electric machine within a specified temperature range by actuating at least the valve.

6. The traction drive of claim 1, wherein the stored temperature model takes into account one or more of (i) a rate of change of coolant temperature, (ii) an acceleration of temperature change, (iii) climate, and (iv) characteristics of the traction drive.

7. The traction drive according to claim 1, wherein the valve includes a first valve position and a second valve position, wherein in the first valve position the valve opens the heat exchanger for a flow of coolant from the first cooling circuit, and in the second valve position the valve closes coolant flow to the heat exchanger, and wherein the valve is configured as a 4/2-way valve or a 6/2-way valve.

8. The traction drive according to claim 7, further comprising a throttle connected in parallel to the heat exchanger, wherein the valve is configured, in the first valve position, to open the heat exchanger for the coolant flow of the first cooling circuit instead of the throttle, and in second valve position, the valve blocks coolant flow through the heat exchanger and opens a path to the throttle for the coolant flow.

9. The traction drive according to claim 1, wherein the valve is a first valve and further comprising a second valve, the second valve arranged in the second cooling circuit for adjusting the coolant flowing from the second cooling circuit through the heat exchanger.

10. The traction drive according to claim 9, wherein the second valve is configured as a 4/2-way valve including a first valve position and a second valve position, wherein in the first valve position of the second valve, the second valve opens coolant flow from the second cooling circuit through the heat exchanger and in the second valve position of the second valve, flow through the heat exchanger is blocked.

11. The traction drive according to claim 1, comprising an air cooler configured and arranged for cooling the coolant in the first cooling circuit by means of air.

12. The traction drive according to claim 11, comprising a thermostat arranged upstream from the air cooler in the first cooling circuit, wherein when the coolant temperature in the first cooling circuit is below a specified temperature threshold, the thermostat is configured to close off at least partially a coolant path through the air cooler and to open up at least partially a bypass for the coolant which bypasses the air cooler and, when the coolant temperature in the first cooling circuit is above the specified temperature threshold, the thermostat is configured to open up at least partially the coolant path through the air cooler and to close off the bypass at least partially.

13. A method for maintaining a specified temperature of one or more drive components of a traction drive, the method comprising:
providing a traction drive for propelling a vehicle, the traction drive comprising:
an inverter;
an electric machine;
a cooling system configured for tempering the inverter and the electric machine, wherein the cooling system comprises a first cooling circuit with a first coolant, a second cooling circuit with a second coolant, and a heat exchanger;
wherein the heat exchanger is configured to transfer heat between the first and second cooling circuits;
wherein the first cooling circuit passes through the inverter;
wherein the second cooling circuit passes through the electric machine; and
a valve arranged in the first cooling circuit for adjusting the first coolant passing from the first cooling circuit through the heat exchanger; and
actuating the valve, based on a stored temperature model of the traction drive, to adjust the flow of coolant passing through the heat exchanger, thereby maintaining the specified temperature of the inverter and the electric machine.

14. The method according to claim 13, wherein actuating the valve is performed at least in part based on a change in a temperature of one or both of the inverter and the electric machine.

15. The method according to claim 14, wherein actuating the valve takes into account one or more of (i) a rate of change of coolant temperature, (ii) an acceleration of temperature change, (iii) climate, and (iv) characteristics of the traction drive.

* * * * *